United States Patent
Morimoto et al.

[11] Patent Number: 5,946,078
[45] Date of Patent: Aug. 31, 1999

[54] DUST EXCLUDING MECHANISM FOR AN IMAGE RECORDING APPARATUS

[75] Inventors: Yoshinori Morimoto; Masaaki Konno; Kenichi Saito, all of Kanagawa, Japan

[73] Assignee: Fuji Photo Film Co., Ltd., Kanagawa, Japan

[21] Appl. No.: 08/864,117

[22] Filed: May 28, 1997

[30] Foreign Application Priority Data

May 28, 1996 [JP] Japan .................................. 8-133404

[51] Int. Cl.⁶ .................................................. H01L 21/30
[52] U.S. Cl. ................................................................. 355/30
[58] Field of Search .......................... 399/92, 93; 355/30, 355/72, 73, 53, 55

[56] References Cited

U.S. PATENT DOCUMENTS

| | | | |
|---|---|---|---|
| 5,633,698 | 5/1997 | Imai | 355/72 |
| 5,711,033 | 1/1998 | Green et al. | 2/171.3 |

*Primary Examiner*—Safet Metjahic
*Assistant Examiner*—Michael Dalakis
*Attorney, Agent, or Firm*—Birch, Stewart, Kolasch & Birch, LLP

[57] ABSTRACT

According to the improved apparatus for recording images using exposing optics equipped with a dust excluding mechanism which prevents optical paths of light beams from being blocked by dust particles, the dust excluding mechanism has a fan and at least two filters, and at least one of the filters which is provided upstream of an air stream generated by the fan is fitted to be detachable. With the improved image recording apparatus of the invention, not only during scanning exposure, in a standby mode and in a power OFF mode but also during filter replacements, one can prevent the entrance of the dust particles into the duct, thereby ensuring that the light beams issuing from the exposing optics during scanning exposure will not have any part of their paths blocked by the dust particles. As a result, one can record defect-free images of high quality that do not have any density unevenness occurring in the form of streaks due to the dust particles.

19 Claims, 4 Drawing Sheets

DUST EXCLUDING MECHANISM FOR AN IMAGE RECORDING APPARATUS

BACKGROUND OF THE INVENTION

1. Field of the Invention

This invention relates to an image recording apparatus which operates by raster scanning, or a method of two-dimensional scanning exposure of a light-sensitive material that is transported in an auxiliary scanning direction as it is scanned with light beams that are emitted from exposing light sources and which are being deflected in the main scanning direction. More particularly, the invention relates to an image recording apparatus that employs exposing optics equipped with a dust excluding mechanism which prevents the optical paths of the light beams from being blocked by dust particles.

2. Description of the Background Art

In a raster scan based image recording apparatus, light beams emitted from exposing light sources of three colors, red (R), green (G) and blue (B), are first shaped to parallel light by means of collimator lenses associated with the respective exposing light sources R, G and B. The collimated light beams are then allowed to be incident on a light deflector such as a polygonal mirror to be deflected in the main scanning direction and, thereafter, they are adjusted by an fθ lens such that they are incident on the light-sensitive material to form a focused image of a specified shape in a specified position.

The light-sensitive material is withdrawn from a magazine in which it is contained in a suitable form such as a roll and subsequently transported by a suitable means such as a auxiliary scanning transport means at a specified speed in the auxiliary scanning direction which is perpendicular to the main scanning direction. The light-sensitive material in a web form that has been transported in the auxiliary scanning direction to the image recording position by the auxiliary scanning transport means is subjected to two-dimensional scanning exposure with the light beams from the exposing light sources R, G and B that are being deflected in the main scanning direction, whereby a latent image is recorded on the entire surface of the light-sensitive material.

In most cases, the exposing optics in the image recording apparatus of the raster scan type employs exposing light sources that are capable of emitting light beams at wavelengths in a specified narrow range, such as semiconductor lasers (LD), light-emitting diodes (LED) and other light-emitting devices that have advantages such as low cost and small size.

Mirrors, lenses and other optical elements used in the exposing optics in the image recording apparatus are usually sealed within an enclosure to prevent dust adhesion on their surfaces. The enclosure is provided with an entrance window in the area through which the light beams from the respective exposing light sources are admitted into the enclosure and also provided with an exit window in the area through which the light beams will eventually emerge from the enclosure.

In practice, however, the edges of the light-sensitive material are abraded during transport in the image recording apparatus to generate dust particles and, in addition, the various kinds of dust in the air which include the dust particles originating from the light-sensitive material are adsorbed on the surface of the beam exit window on the enclosure for various reasons, including the contact and friction of the light-sensitive material with the rollers between which it is held for transport and the static charges that build up in the exposing optics due, for example, to the rotation of the polygonal mirror. The dust adsorbed on the surface of the exit window partly blocks the optical paths of the light beams issuing from the respective exposing light sources and their amounts are reduced to cause a serious problem, i.e., unevenness in density develops as streaks in those areas of the recorded image which have received the smaller quantity of light.

One of the means that have been proposed with a view to solving this problem is an image recording apparatus that employs exposing optics having a dust excluding (dustproof) mechanism which ensures that the optical paths of the light beams emitted from the exit window on the enclosure of the optical elements will not be blocked by dust particles.

Figure 5:
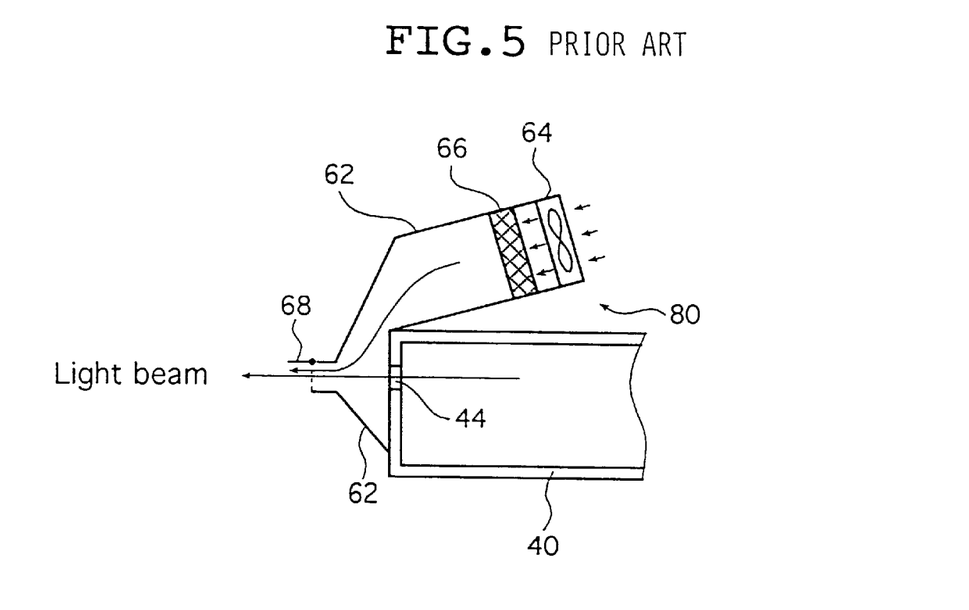
FIG. 5 shows the concept of a prior art dust excluding mechanism used in the exposing optics.

The concept of an exemplary dust excluding mechanism for use in this type of exposing optics is shown in FIG. 5. The dust excluding mechanism generally indicated by 80 comprises a duct 62 having an entrance for an air stream, an entrance for light beams and an exit common to the air stream and light beams, a fan 64, a filter 66 and a shutter 68 for closing the exit of the duct 62 which is common to the air stream and light beams.

In the illustrated dust excluding mechanism 80, the light beam entrance of the duct 62 is fixed to the exit window 44 on the enclosure 40 of the optical elements through which the light beams from the exposing light sources will emerge, and the shutter 68 is fitted at the exit of the duct 62 which is common to the air stream and light beams. The fan 64 is fitted at the entrance of the duct 62 through which the air stream is admitted, whereas the filter 66 is detachably fitted downstream of the fan 64 in the direction of the air stream.

The shutter 68 fitted at the exit of the duct 62 which is common to the air stream and light beams is opened only in the case of actual scanning exposure. Thus, the shutter 68 is closed both in a standby mode where scanning exposure is not performed and in a power OFF mode so that dust particles will not get into the duct 62.

To perform scanning exposure, the shutter 68 is opened and, at the same time, the fan 64 operates to supply the duct 62 with an air stream that has been freed of dust particles by means of the filter 66. Stated more specifically, a clean air stream is supplied into the duct 62 by means of the combination of the fan 64 and the filter 66 and emerges from the duct 62, with the shutter 68 opened, through the exit common to the air stream and light beams, whereby the entrance of dust particles into the duct 62 is prevented.

By providing the exposing optics with the dust excluding mechanism for preventing the entrance of dust into the duct 62, one can ensure that the dust particles will not be adsorbed on the surface of the exit window 44 on the enclosure 40 of the optical elements and that the light beams incident on the light-sensitive material after emerging from the duct 62 through the exit will not have any part of their optical paths blocked by the dust particles. As a result, one can record defect-free images of high quality that do not have any density unevenness occurring in the form of streaks due to the dust particles.

A problem with the dust excluding mechanism 80 is that depending on the environment of use, the performance characteristics of the filter 66 will deteriorate in several months and it is no longer capable of complete removal of the dust particles which are the cause of density unevenness in the form of streaks. In addition, the airflow resistance increases to lower the dust excluding effect of the filter. Therefore, filter replacements have to be made once every few months.

However, during filter replacement, dust may occasionally enter the duct 62 to be eventually adsorbed on the surface of the exit window 44, potentially causing image defects such as the density unevenness in the form of streaks.

SUMMARY OF THE INVENTION

The present invention has been accomplished under these circumstances and has as an object providing an image recording apparatus that enables filter replacements on a dust excluding mechanism without permitting dust particles to enter the duct and which hence is capable of recording high-quality images without defects due to the dust particles.

To achieve the above object, the invention provides an apparatus for recording images using exposing optics equipped with a dust excluding mechanism which prevents optical paths of light beams from being blocked by dust particles, said dust excluding mechanism having a fan and at least two filters, at least one of said filters being provided upstream of an air stream generated by said fan being fitted to be detachable.

It is preferred that said dust excluding mechanism further includes a duct having an entrance for said air stream, an entrance for said light beams and an exit common to said air stream and said light beams, and a shutter for closing the exit common to said air stream and said light beams.

It is also preferred that of said at least two filters, one which is fitted upstream of said air stream has fine mesh openings whereas one which is fitted downstream of said air stream has coarse mesh openings.

It is further preferred that said apparatus further includes a cushion provided downstream of said fan in a direction of said air stream in order to ensure that vibrations generated by said fan will not propagate to said exposing optics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention.

DETAILED DESCRIPTION OF THE INVENTION

The image recording apparatus of the invention will now be described with reference to the preferred embodiments shown in accompanying drawings.

Figure 1:
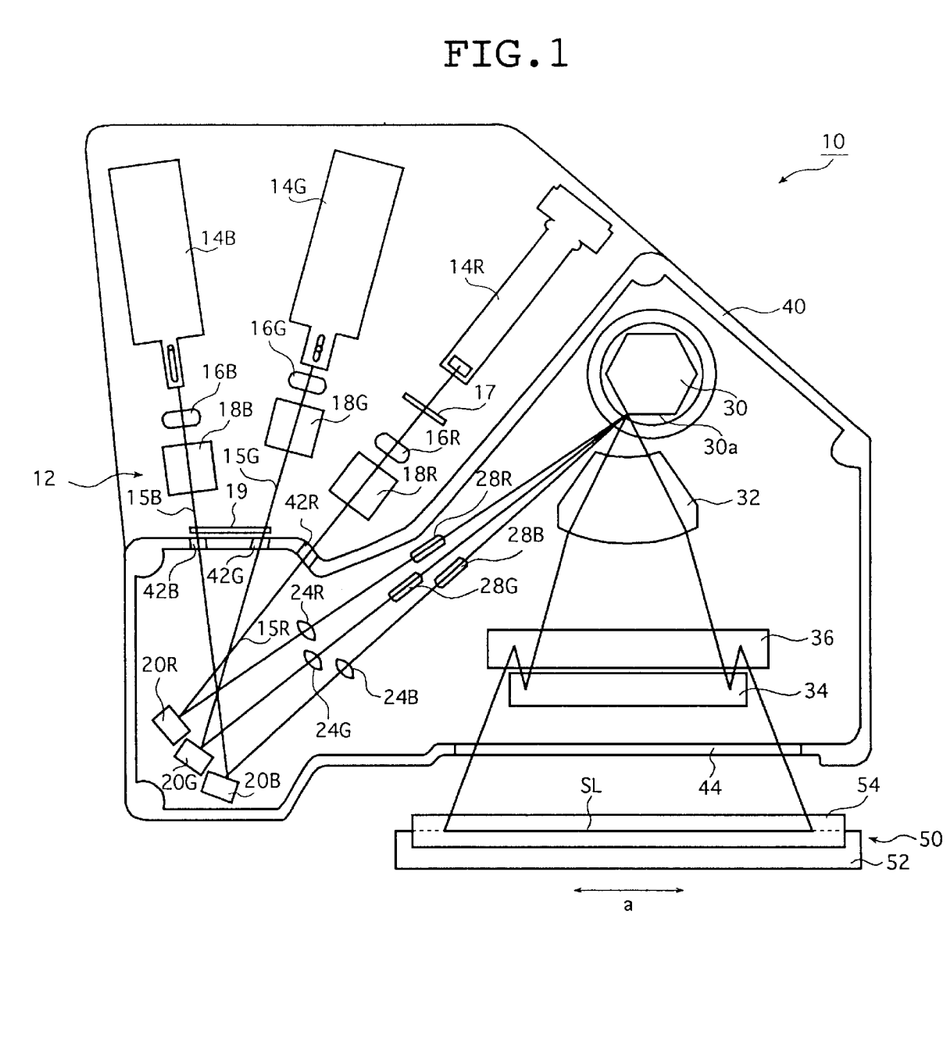
FIG. 1 is a schematic plan view of the exposing optics in an image recording apparatus according to an embodiment of the invention.
Figure 2:
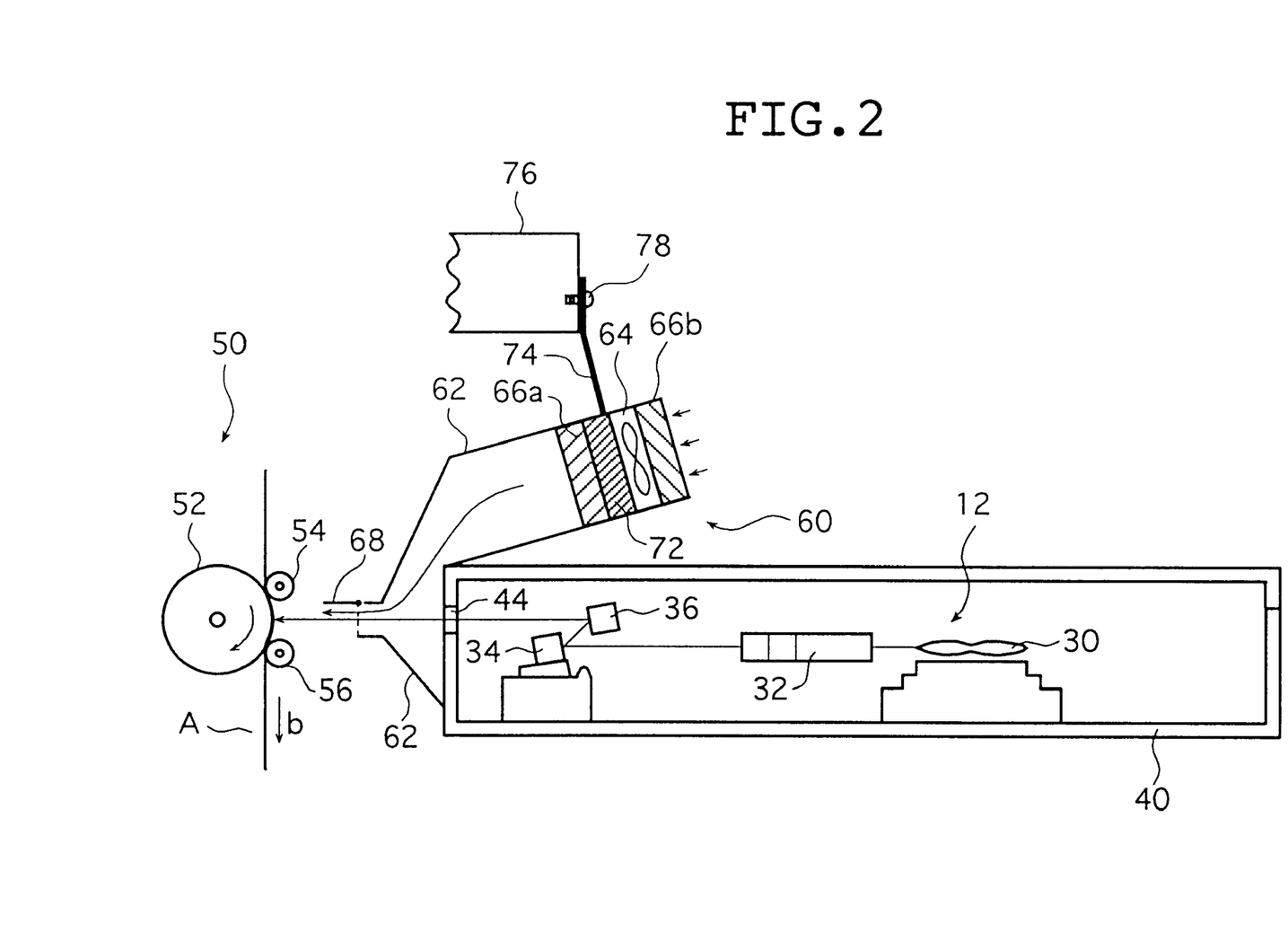
FIG. 2 is a schematic cross section of the same exposing optics equipped with a dust excluding mechanism according to an embodiment of the invention.

FIG. 1 is a plan view of the exposing optics in an image recording apparatus according to an embodiment of the invention, with the top of the sealed enclosure removed. FIG. 2 is a schematic cross section of the same exposing optics equipped with a dust excluding mechanism according to an embodiment of the invention.

In the illustrated case, the exposing optics generally indicated by 10 comprises a main scanning section 12 having a plurality of optical elements which scan exposes a web of light-sensitive material A in the main scanning direction (indicated by two-head arrow a in FIG. 1), the sealed enclosure 40 which accommodates some of the optical elements in the main scanning section 12 as they are isolated from the ambient atmosphere, an auxiliary scanning section 50 composing auxiliary scanning transport means which transports the light-sensitive material A in an auxiliary scanning direction (indicated by arrow b in FIG. 2) which is substantially perpendicular to the main scanning direction as the material A is held in a specified exposing position, and a dust excluding (or dustproof) mechanism 60 which is the characterizing portion of the invention.

In the illustrated exposing optics 10, the light beams of three primary colors as modulated in accordance with the (exposure densities of) image to be recorded are deflected and scanned in the main scanning direction by means of the main scanning section 12 while, at the same time, the web of light-sensitive material A is transported by the auxiliary scanning section 50 in the auxiliary scanning direction substantially normal to the main scanning direction as it is held in the predetermined exposing position, such that the light-sensitive material A is subjected to two dimensional scanning exposure by the three light beams to record a latent image.

The main scanning section 12 has three exposing light sources, i.e., a semiconductor laser (LD) 14R which is a laser light source for emitting a light beam for exposure to red (R) light, a wavelength-converting laser (G-SHG) employing a second-harmonic generation (SHG) device which is a laser light source for emitting a light beam for exposure to green (G) light, and a wavelength-converting laser (B-SHG) employing a SHG device which is a laser light source for emitting a light beam for exposure to blue (B) light.

The main scanning section 12 also contains the following components which are arranged in the direction of travel of the light beams emitted from the laser light sources 14R, 14G and 14B: collimator lenses 16R, 16G and 16B; acoustic optical modulators (AOM) 18R, 18G and 18B; reflector mirrors 20R, 20G and 20B; spherical lenses 24R, 24G and 24B; cylindrical lenses 28R, 28G and 28B; a polygonal mirror 30; an fθ lens 32; a cylindrical mirror 34; and a reflector mirror 36.

The main scanning section 12 composes three-laser beam different-angle incidence optics (three-light source non-beam-synthesizing optics) by means of which the light-sensitive material A having wavelength dependency in spectral sensitivity, in particular, a normal color light-sensitive material having the peaks of the spectral sensitivities for the three primary colors within the visible range, is to be scan exposed using light beams of the three primary colors; the laser beams of three primary colors 15R, 15G and 15B reflected from the reflector mirror 36 are incident on the light-sensitive material A being transported by the auxiliary scanning transport means in the auxiliary scanning section 50 such as to form the main scanning line SL.

The illustrated three-light source non-beam-synthesizing optics has three laser light sources 14R, 14G and 14B which emit light at wavelengths in a specified narrow range to be incident on a reflecting surface 30*a* of the polygonal mirror 30 at slightly differing angles (by, for example, 4 degrees). The LD 14R for exposure to red light emits a light beam at a wavelength of 680 nm; the G-SHG 14G for exposure to green light emits a light beam at a wavelength of 532 nm; and the B-SHG 14B for exposure to blue light emits a light beam at a wavelength of 473 nm.

The exposing optics to be used with the image recording apparatus of the invention is in no way limited to the three-light source non-beam-synthesizing optics such as the illustrated three-laser beam different-angle incidence optics and any exposing optics that is capable of scan exposing of the light-sensitive material using light beams of the three primary colors may be employed, as exemplified by exposing optics in which the three light beams from three sources are combined into a single beam by such means as a dichroic mirror to be incident on a polygonal mirror.

The light exposing sources are also not limited to any particular type and any combination of light sources capable of exposing the light-sensitive material having wavelength dependency in spectral sensitivity may be employed, as exemplified by semiconductor lasers such as laser diodes (LDs) and gas lasers such as a He-Ne laser; any light sources that emit light beams at specified wavelengths, particularly those in a narrow portion of the visible range may be selected as appropriate for the spectral sensitivity characteristics of the light-sensitive material.

The collimator lenses 16R, 16G and 16B shape the laser light beams 15R, 15G and 15B from the laser light sources 14R, 14G and 14B to produce beam waists on the AOMs 18R, 18G and 18B, respectively.

In response to image data signals of the respective colors that have been obtained by image processing with an image processing apparatus (not shown), the AOMs (acoustic optical modulators) 18R, 18G and 18B modulate the laser light beams 15R, 15G and 15B.

It should also be noted that the method of modulating the respective light beams is not limited in any particular way and any modulation technique may be employed. For instance, various optical modulators other than the AOMs in the illustrated case may be employed or, alternatively, part of the laser light sources may be directly modulated by either intensity (pulse amplitude modulation (PAM)), pulse number modulation (PNH) or pulse width modulation (PWM).

A mechanical shutter 17 is provided between the laser light source 14R and the collimator lens 16R, and another mechanical shutter 19 is provided between the group of AOM 18B and 18G and the group of entrance windows 42B and 42G on the sealed enclosure 40 to be described below. The mechanical shutter 17 (or 19) transmits the laser light beam 15R (or laser light beams 15B and 15G) as long as the light-sensitive material A being transported by the auxiliary scanning section 50 is exposed for one image; on the other hand, during the period from the end of exposure for one image to the start of exposure for the next image, both shutters interrupt the laser light irrespective of whether the period is equal to the distance between two frames or exposure shutdown.

The mechanical shutters may be of any type that is capable of interrupting the optical paths of the laser light beams 15R, 15G and 15B, as exemplified by a rotating shutter in the form of a rotating disk having light-transmitting areas such as notches or through-holes (the shutter 19 should have at least two light-transmitting areas for admitting the laser light beams 15B and 15G) or a reciprocating shutter. Since laser light source 14R can be turned on and off at high speed, the shutter 17 may be replaced by on/off switching of the laser light source 14R which is capable of performing a comparable shutter action.

The reflector mirrors 20R, 20G and 20B bend back the optical paths of the laser light beams 15R, 15G and 15B, respectively, such that they are incident in the same line on the reflecting surface 30*a* of the polygonal mirror 30 either in close positions or at the same point.

The respective spherical lenses 24R, 24G and 24B convert the respective laser light beams 15R, 15G and 15B which are radiated divergently from the respective beam waists produced on the AOMs 18R, 18G and 18B into the laser light beams 15R, 15G and 15B beam sizes of which are not varied.

The cylindrical lenses 28R, 28G and 28B adjust the respective beam diameters of the laser light beams 15R, 15G and 15B in the auxiliary scanning direction and combine with the fθ lens 32 and the cylindrical mirror 34 to compose tilt correcting optics for correcting the tilt of the polygonal mirror 30.

The polygonal mirror 30 deflects the imagewise modulated laser light beams 15R, 15G and 15B in the main scanning direction to form the main scanning line SL on the light-sensitive material A to thereby perform imagewise exposure.

The laser light sources 14R, 14G and 14B are provided such that the laser light beams 15R, 15G and 15B they emit are incident on one reflecting surface 30*a* of the polygonal mirror 30 at slightly differing angles, reflected by the surface 30*a*, focused at different angles in the same scanning line SL which is eventually formed on the light-sensitive material A, whereby the respective laser light beams 15R, 15G and 15B will scan over the same scanning line at spaced time intervals.

The fθ lens 32 ensures that the respective laser light beams 15R, 15G and 15B are each correctly focused in every position on the main scanning line SL. The fθ lens 32 is corrected such that chromatic aberration will lie within tolerable limits for the light having wavelengths of 473, 532 and 680 nm.

The cylindrical mirror 34 combines with the cylindrical lenses 28R, 28G and 28B and the fθ lens 32 to compose the tilt correcting optics; additionally, it bends the respective laser light beams 15R, 15G and 15B to be incident on the reflector mirror 36.

The reflector mirror rebends the respective laser light beams 15R, 15G and 15B to be directed toward the main scanning line SL, which is substantially perpendicular to the auxiliary scanning direction, on the light-sensitive material A being transported by the auxiliary scanning section 50 in the auxiliary scanning direction.

In the illustrated exposing optics 10, part of the optical elements that compose the three-light source non-beam-synthesizing optics in the main scanning section 12, namely, the reflector mirrors 20R, 20G and 20B, spherical lenses 24R, 24G and 24B, cylindrical lenses 28R, 28G and 28B, polygonal mirror 30, fθ lens 32, cylindrical lens 34 and reflector mirror 36, are contained within the sealed enclosure 40 such that they are fixed at predetermined positions in the enclosure 40 which serves as a surface plate.

It should be noted that the laser light sources 14R, 14G and 14B, as well as the collimator lenses 16R, 16G and 16B, and the AOMs 18R, 18G and 18B are provided exterior to the enclosure 40.

The enclosure 40 has a desired capacity and shape such that it is capable of isolating its interior from the ambient atmosphere to exclude the external light and the effects of unwanted matter such as dust particles. In the illustrated case, part of the enclosure, for example, a portion that corresponds to the lid is formed to be detachable from the other parts. The enclosure 40 can be fabricated from a light-shielding material, for example, a metal such as aluminum, a synthetic resin or any other material known to be useful with optical recording apparatus, by any known process such as forging, press forming or injection molding.

The laser light beams 15R, 15G and 15B which have been modulated with the AOMs 18R, 18G and 18B in the main scanning section 12 exterior to the enclosure 40 are launched into the enclosure 40 to be directed toward the internal reflector mirrors 20R, 20G and 20B by passing through incidence windows 42R, 42G and 42B which are formed in the sidewall portion of the enclosure 40; the incident laser light beams 15R, 15G and 15B are reflected by the internal reflector mirror 36 and emerge from the enclosure 40 to be directed toward the auxiliary scanning section 50 exterior to the enclosure 30 by passing through an exit window 44 which is formed in its sidewall portion.

The optical elements which compose the exposing optics may be fixed and supported, either outside or within the enclosure 40, in predetermined positions on the surface plate defined by the bottom surface of the enclosure as they are positioned by known means such as grooves, projections, pins and leaf springs. Alternatively, the optical elements may be supported, fixed or securely attached to fitting members, which are positioned by various positioning means and secured by means of fasteners such as screws, whereby the optical elements are fixed and supported in position.

The auxiliary scanning section 50 has an exposing drum 52 capable of forward or reverse rotation, and follower nip rollers 54 and 56 which are positioned on opposite sides of the main scanning line SL defined in the exposing position on the light-sensitive material A on the exposing drum and which urge the light-sensitive material A against the exposing drum 52. The exposing drum 52 rotates in a forward direction during scanning exposure of at least one image so that the web of light-sensitive material A is transported in the auxiliary scanning direction for scanning exposure as it is held between the exposing drum 52 and each of the nip rollers 54 and 56 to stand in the exposing position.

In the illustrated case, the dust excluding mechanism 60 which is the characterizing part of the invention comprises a duct 62 having an entrance for an air stream, an entrance for light beams and an exit common to the air stream and light beams, a fan 64, filters 66a and 66b, and a shutter 68 for closing the exit of the duct 62 which is common to the air stream and light beams.

In the illustrated dust excluding mechanism 60, the beam entrance of the duct 62 is fixed to the exit window 44 on the enclosure 40 of the exposing optics 10 through which the laser light beams 15R, 15G and 15B from the laser light sources 14R, 14G and 14B will emerge, and the shutter 68 is fitted at the exit of the duct 62 which is common to the air stream and light beams. The fan 64 is fitted at the entrance of the duct 62 through which the air stream is admitted, whereas the filters 66a and 66b are fitted ahead of and behind the fan 64.

Of the two filters, the filter 66a which is fitted downstream of the fan 64 in the direction of an air flow is, in principle, not adapted for filter replacements and may be fixed to the inner surface of the duct 62. On the other hand, the filter 66b which is fitted upstream of the fan in the direction of an air flow is intended to be replaced by a clean one at regular intervals, for example, once per year and, hence, is fitted on the surface of the fan 64 to be easily detachable as required to effect filter replacements.

In a standby mode where scanning exposure is not performed and in a power OFF mode, the shutter 68 fitted at the exit of the duct 62 which is common to the air stream and light beams is closed and the fan 64 is stopped. Thus, the shutter 68 is closed both in a standby mode where scanning exposure is not performed and in a power OFF mode so that the dust particles will not get into the duct 62.

To perform scanning exposure, the shutter 68 is opened and, at the same time, the fan 64 operates to supply the duct 62 with an air stream that has been freed of dust particles by means of the filters 66a and 66b. Thus, in the scanning exposure mode, a clean air stream is supplied into the duct 62 by means of the combination of the fan 64 with the filters 66a and 66b and emerges from the duct 62 through the exit common to the air stream and light beams, whereby the entrance of dust particles into the duct 62 is prevented.

For filter replacement, the shutter 68 is closed and the fan 64 is stopped or removed such that only the filter 66b fitted detachably upstream of the fan 64 in the direction of an air stream is replaced by a clean one. Even if the filter 66b is removed for replacement, the shutter 68 and the filter 66a fitted downstream of the fan 64 in the direction of an air stream combine to prevent the entrance of dust into the duct 62.

Thus, not only during scanning exposure, in a standby mode and in a power OFF mode but also during filter replacements, one can prevent the entrance of dust into the duct 62, thereby ensuring that the dust particles will not be adsorbed on the surface of the exit window 44 on the enclosure 40 of the exposing optics and that the light beams incident on the light-sensitive material A after emerging from the duct 62 through the exit will have any part of their optical paths blocked by the dust particles. As a result, one can record defect-free images of high quality that do not have any density unevenness occurring in the form of streaks due to the dust particles.

Needless to say, the filters 66a and 66b may be selected as appropriate for the environment of use and the characteristics required and, hence, are not limited in any particular way, except that the filter 66a (during the replacement of the filter 66b) and the filter 66b (during scanning exposure) should be capable of rejecting those dust particles in air which are sufficiently larger than the beam diameters of the laser light beams 15R, 15G and 15B from the laser light sources 14R, 14G and 14B to cause unevenness in density. In the invention, electrostatic filters can be used as the filters 66a and 66b.

Figure 3A:
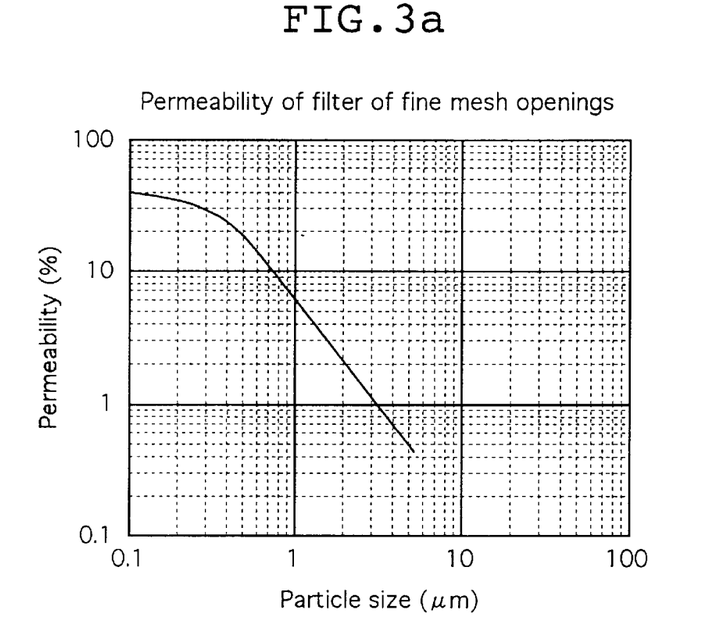
FIG. 3a is a graph showing the performance characteristic of an electrostatic filter of fine mesh openings.
Figure 3B:
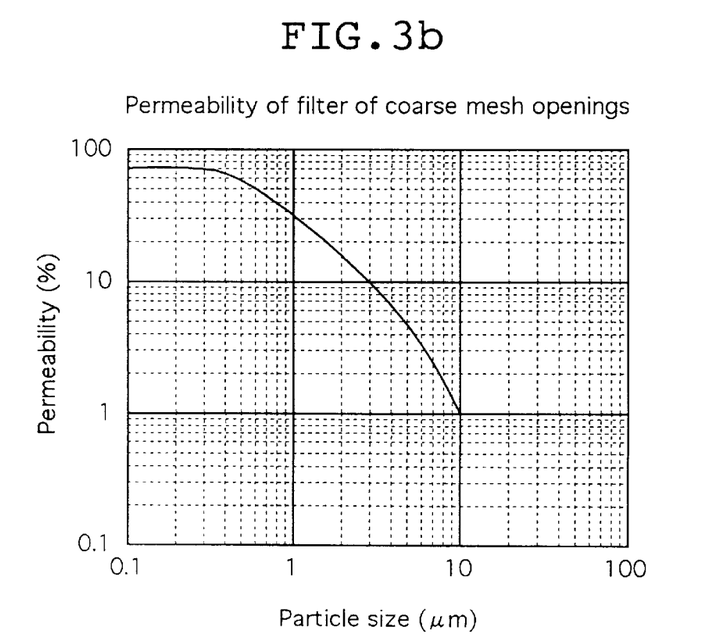
FIG. 3b is a graph showing the performance characteristic of an electrostatic filter of coarse mesh openings.

FIG. 3a is a graph showing an example of the performance characteristic of an electrostatic filter of comparatively fine mesh openings, and FIG. 3b is a graph showing an example of the performance characteristic of an electrostatic filter of comparatively coarse mesh openings.

Obviously, given dust particles of the same size, the filter of fine mesh openings has a lower permeability than the filter of coarse mesh openings. Electrostatic filters are made of fibers having permanent electrization, and adsorb dust particles electrostatically. The characteristics of the electrostatic filters do not depend on the size of mesh openings of the filter, and the electrostatic filters are capable of static adsorption of dust particles which are smaller than the mesh openings. Therefore, these electrostatic filters are suitable for capturing small foreign particles and fine dust particles, for example having a particle diameter of 10 to 0.1 $\mu$m. In normal filters, the size of mesh openings determines the particle diameter of foreign particles and dust particles which can be captured. Normal filters used for the capture of fine dust particles are difficult to manufacture and expensive. Relatively cheap and available normal filters are not in general capable of capturing dust particles having a particle diameter less than 20 $\mu$m. Therefore, according to the invention, at least the filter 66b having fine mesh openings is preferably an electrostatic filter. It is further preferred that these two filters 66a and 66b, more preferably all filters, are electrostatic filters. An Example of the electrostatic filter includes Filtrete from SUMITOMO 3M.

Hence, in order to ensure that the dust particles sufficiently larger than the diameter of the light beams to cause density unevenness in the form of streaks can be rejected during scanning exposure, namely, when the shutter 68 is opened and the fan 64 operates to generate an air stream and also to ensure that the performance characteristics of the filter 66a which, in principle, is not adapted for filter replacements can most effectively be prevented from deteriorating due to the adsorption of fine dust particles, the filter 66b fitted upstream of the fan 64 in the direction of an airstream is preferably selected from among those which have comparatively fine mesh openings. Dust particles which must be removed by the filter 66b fitted upstream have a size which causes density unevenness in the form of streaks, and the size of the dust particles can be determined depending on the diameter of the light beams for recording. In the case of high quality image recording for example, the filter 66b preferably removes dust particles having a diameter exceeding 10 $\mu$m. It should be noted that the filter 66b located upstream is always exposed to the ambient air stream (air flow) by the fan 64 during the operation of the image recording apparatus, and is extremely and rapidly stained. Therefore, it is necessary to replace the filter in a short time period, for example every year.

On the other hand, in order to ensure that dust particles sufficiently larger than the diameter of the light beams to cause density unevenness in the form of streaks will not get into the duct 62 during the replacement of the filter 66b, namely, when the shutter 68 is closed and the fan 64 has stopped rotating or removed , and also to ensure that the smallest possible airflow resistance will develop during scanning exposure, the filter 66a fitted downstream of the fan 64 in the direction of an airstream is preferably selected from among those which have comparatively coarse mesh openings. The outer filter 66b takes a few minutes for replacement, and the fan 64 is stopped or removed and the interior of the duct 62 is not under pressure during replacement. Therefore, the possibility of entering foreign particles into the duct 62 is extremely low. In addition, stains of the filter 66a which is not replaced are not at a level causing a problem. Moreover, if a filter with coarse mesh openings is used as the interior filter 66a, deterioration due to the air flow can be reduced, and air flow rate from the outlet of the duct 62 can be increased, which increases the effect of preventing foreign particles from entering through the outlet. It should be noted that the inventor confirms by experiments that the constitution of the invention brings about less stains, hence satisfied performances even after the filter 66a was used for a long term, especially corresponding to the service life of the image recording apparatus, for example 6 years. Therefore, the filter 66a located upstream is preferably a filter which has coarser mesh openings than the filter 66b.

Figure 4:
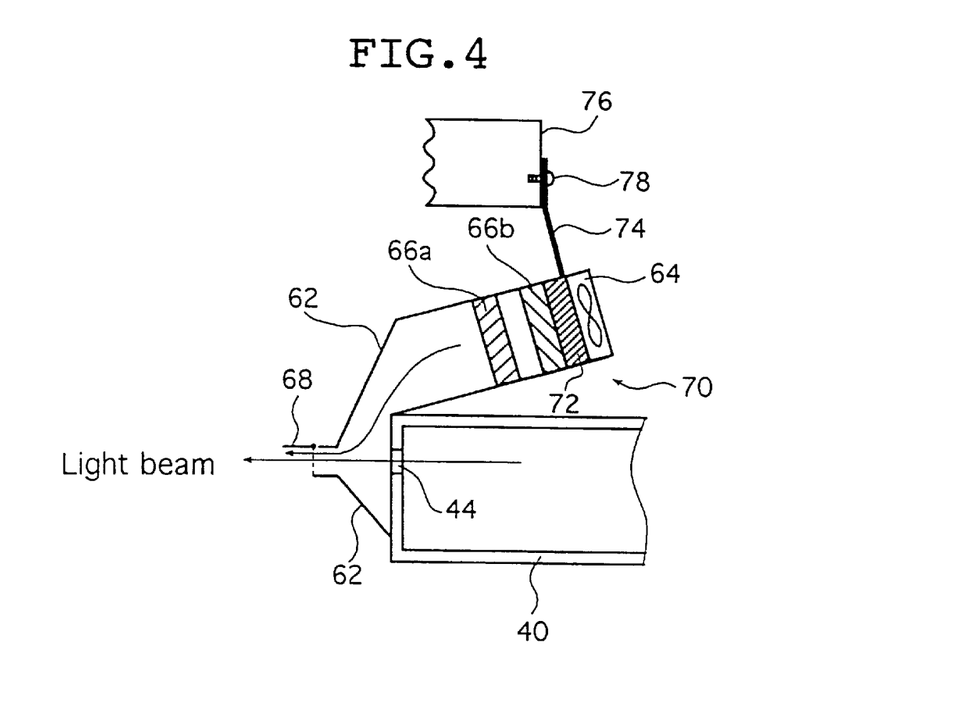
FIG. 4 is a partial view showing the concept of another embodiment of the dust excluding mechanism to be used in the exposing optics in the image recording apparatus of the invention.

FIG. 4 is a partial view showing the concept of another embodiment of the dust excluding mechanism for use in the image recording apparatus of the invention. The dust excluding mechanism indicated by 70 in FIG. 4 and the dust excluding mechanism 60 used in the exposing optics shown in FIG. 2 are essentially the same except for the layout of filters 66a and 66b. Briefly, the filters 66a and 66b in the dust excluding mechanism 70 are both fitted downstream of the fan 64 in the direction of an air stream. The other components of the dust excluding mechanism 70 which are identical to those of the dust excluding mechanism 60 are identified by like numerals and will not be described in detail.

Thus, in the dust excluding mechanism for use in the image recording apparatus of the invention, the filters 66a and 66b may be provided ahead of and behind the fan 64 as shown in FIG. 2 or, alternatively, both filters may be provided downstream of the fan 64 in the direction of an air stream as shown in FIG. 4. In still another embodiment which is not shown, both filters may be provided upstream of the fan 64 in the direction of an air stream.

In the illustrated cases, a total of two filters (i.e., 66a and 66b) are used; however, this is not the sole case of the invention and it can attain its object if at least two filters are employed, one being the filter which in principle is not adapted for filter replacements and the other being fitted such that it is easily detachable from the duct 62. For instance, two or more filters may be combined to fabricate a filter unit having the desired characteristics.

Exposing optics usually hate vibrations, so in order to ensure that vibrations generated by the fan 64 in the dust excluding mechanism 60 shown in FIG. 2 and the dust excluding mechanism 70 shown in FIG. 4 will not be transmitted to the exposing optics, the fan 64 is fixed to a bracket 74, which is fixed by means of screws 78 to a frame 76 located above in FIGS. 2 and 4 and protected from vibrations generated in the exposing optics. This structure prevents vibrations generated in the fan 64 from propagating to the enclosure 40. In order to further prevent vibrations from propagating, a cushion 72 is preferably provided downstream of the fan 64 in the direction of an air stream. Referring to the dust excluding mechanism 60 shown in FIG. 2, a cushion 72 such as sponge is preferably provided between the fan 64 and the filter 66a; in the dust excluding mechanism 70 shown in FIG. 4, a similar cushion 72 is preferably provided between the fan 64 and the filter 66b. The cushion 72 is adhered to the fan 64 by means of an adhesive or a double-coated tape. In addition, the cushion 72 is not fixed by means of the screws, but only pressed against the filter 66a in the dust excluding mechanism 60 shown in FIG. 2, and the filter 66b in the dust excluding mechanism 70 shown in FIG. 4 respectively, in order to prevent vibrations between the cushion 72 and the filter 66a or 66b.

While the image recording apparatus of the invention has been described above in detail, it should of course be understood that the invention is in no way limited to the foregoing embodiments and various improvements and modifications are possible without departing from the scope of the invention.

As described above in detail, the image recording apparatus of the invention is characterized in that while at least two filters are provided in the dust excluding mechanism in the exposing optics, at least one filter which is positioned upstream of the air flow is fitted to be detachable for filter replacement whereas the other filter or filters are fixed to be unremovable.

Therefore, with the image recording apparatus of the invention, not only during scanning exposure, in a standby mode and in a power OFF mode but also during filter replacements, one can prevent the entrance of the dust particles into the duct, thereby ensuring that the light beams issuing from the exposing optics during scanning exposure will not have any part of their paths blocked by the dust particles. As a result, one can record defect-free images of high quality that do not have any density unevenness occurring in the form of streaks due to the dust particles.

What is claimed is:

1. An apparatus for recording images using exposing optics equipped with a dust excluding mechanism which prevents optical paths of light beams from being blocked by dust particles, said dust excluding mechanism having a fan and at least two filters, at least one of said filters being provided upstream of an air stream generated by said fan and being fitted to be detachable, wherein said dust excluding mechanism further includes a duct having an entrance for said air stream, an entrance for said light beams and an exit common to said air stream and said light beams, and a shutter for closing the exit common to said air stream and said light beams.

2. The apparatus according to claim 1, wherein said filter which is provided upstream of said air stream has fine mesh openings, and another of said filters is provided downstream of said fan and has coarse mesh openings.

3. The apparatus according to claim 1, further comprising a cushion provided downstream of said fan in a direction of said air stream in order to ensure that vibrations generated by said fan will not propagate to said exposing optics.

4. The apparatus according to claim 1, wherein the entire interior area of said duct is free of optics.

5. An apparatus for recording images using exposing optics equipped with a dust excluding mechanism which prevents optical paths of light beams from being blocked by dust particles, said dust excluding mechanism comprising:

a duct;

a fan located in said duct;

a first filter located in said duct in an air stream generated by said fan, said first filter being fitted to be detachable from said duct; and a second filter located in said duct in said air stream generated by said fan, wherein said first filter is removable from said duct without disturbing said second filter in said duct, and wherein said duct further comprises:

an entrance for said air stream;

an entrance for said light beams and an exit common to said air stream and said light beams; and a shutter for closing said exit common to said air stream and said light beams.

6. The apparatus according to claim 5, further comprising a cushion provided downstream of said fan in a direction of said air stream for reducing vibrations generated by said fan.

7. The apparatus according to claim 5, wherein said first filter is located upstream from said fan.

8. The apparatus according to claim 7, wherein said first filter has fine mesh openings, and said second filter has coarse mesh openings.

9. The apparatus according to claim 5, wherein said first filter and said second filter are located downstream from said fan.

10. The apparatus according to claim 5, wherein said first filter is located at said entrance in said duct for said air stream.

11. The apparatus according to claim 5, wherein said fan is located at said entrance in said duct for said air stream.

12. The apparatus according to claim 5, wherein said fan is located in said duct between said first filter and said second filter.

13. The apparatus according to claim 12, wherein said second filter is located in said duct between said fan and said exit of said duct.

14. The apparatus according to claim 13, wherein said first filter has fine mesh openings, and said second filter has coarse mesh openings.

15. The apparatus according to claim 14, further comprising a cushion located in said duct between said first filter and said fan for reducing vibrations generated by said fan.

16. The apparatus according to claim 5, wherein said first filter has fine mesh openings, and said second filter has coarse mesh openings.

17. An apparatus for recording images using exposing optics equipped with a dust excluding mechanism which prevents optical paths of light beams from being blocked by dust particles, said dust excluding mechanism comprising:

a duct;

a fan located in said duct;

a first filter located in said duct in an air stream generated by said fan, said first filter being fitted to be detachable from said duct; and a second filter located in said duct in said air stream generated by said fan, wherein said first filter is removable from said duct without disturbing said second filter in said duct, and wherein the entire interior area of said duct is free of optics.

18. An apparatus for recording images using exposing optics equipped with a dust excluding mechanism which prevents optical paths of light beams from being blocked by dust particles, said dust excluding mechanism comprising:

a duct;

a fan located in said duct;

a first filter located in said duct in an air stream generated by said fan, said first filter being fitted to be detachable from said duct; and a second filter located in said duct in said air stream generated by said fan, wherein said first filter is removable from said duct without disturbing said second filter in said duct, and wherein each of said filters are electrostatic filters.

19. The apparatus according to claim 1, wherein each of said filters are electrostatic filters.

* * * * *